(12) United States Patent
Hiebl

(10) Patent No.: US 8,594,438 B2
(45) Date of Patent: Nov. 26, 2013

(54) METHOD FOR THE IDENTIFICATION OF OBJECTS

(75) Inventor: Manfred Hiebl, Sauerlach (DE)

(73) Assignee: EADS Deutschland GmbH, Ottobrunn (DE)

( * ) Notice: Subject to any disclaimer, the term of this patent is extended or adjusted under 35 U.S.C. 154(b) by 148 days.

(21) Appl. No.: 13/145,472

(22) PCT Filed: Jan. 19, 2010

(86) PCT No.: PCT/DE2010/000042
§ 371 (c)(1),
(2), (4) Date: Sep. 7, 2011

(87) PCT Pub. No.: WO2010/083806
PCT Pub. Date: Jul. 29, 2010

(65) Prior Publication Data
US 2011/0311106 A1  Dec. 22, 2011

(30) Foreign Application Priority Data
Jan. 21, 2009 (DE) .......................... 10 2009 005 565

(51) Int. Cl.
*G06K 9/62* (2006.01)
*G06K 9/00* (2006.01)
*G06K 9/34* (2006.01)

(52) U.S. Cl.
USPC ............................ 382/224; 382/106; 382/173

(58) Field of Classification Search
USPC .......................................... 382/224, 106, 173
See application file for complete search history.

(56) References Cited

U.S. PATENT DOCUMENTS 8,396,293 B1 * 3/2013 Korah et al. .................. 382/171

2008/0298638 A1  12/2008  Miyazaki

FOREIGN PATENT DOCUMENTS

EP  1 998 139 A1  12/2008

OTHER PUBLICATIONS

International Search Report with partial English translation dated Aug. 20, 2010 (five (5) pages).
Form PCT/ISA/237 (seven (7) pages), 2010.
Zhu et al., "Building Change Detection Based on Object Extraction in Dense Urban Areas", The International Archives of the Photogrammetry, Remote Sensing and Spatial Information Sciences, 2008, pp. 905-908, vol. XXXVII, part B7, (four (4) pages).
Zhan et al., "Building Extraction from Laser Data by Reasoning on Image Segments in Elevation Slices", International Institute for Geo-Information Science and Earth Observation (ITC), (four (4) pages), 2002.
Girardeau-Montaut et al., "Change Detection on Point Cloud Data Acquired with a Ground Laser Scanner", ISPRS Workshop Laser Scanning, Sep. 12, 2005-Sep. 14, 2005, pp. 1-6, XP002592677, (six (6) pages).

(Continued)

*Primary Examiner* — Utpal Shah
(74) *Attorney, Agent, or Firm* — Crowell & Moring LLP

(57) ABSTRACT

A method for the identification of objects in a predetermined target area involves recording a first and a second height profile of the target area, wherein the two height profiles are recorded at a predeterminable time interval. A height difference profile is determined from the first and the second height profile. The height difference profile is subdivided in equidistant horizontal height sections. The positions of the centroids of the surface areas enclosed by the respective contour lines of the horizontal height sections are calculated and the determined height difference profile and the calculated centroids of the surface areas are supplied to a system for classifying objects.

5 Claims, 1 Drawing Sheet

(56) References Cited

OTHER PUBLICATIONS

Yu et al., "A Novel Contour-Based 3D Terrain Matching Algorithm Using Wavelet Transform", Pattern Recognition Letters, Elsevier, Amsterdam, NL LNKD-DOI: 10.1016/J. Patrec. 2003.09.004, vol. 25, No. 1, Jan. 5, 2004, pp. 87-99, XP004473788, (thirteen (13) pages).

Hug et al., "Advanced Lidar Data Processing with LasTools", XXth ISPRS Congress, Jul. 12, 2004-Jul. 23, 2004 pp. 1-6, XP002592676 (six (6) pages).

Hamish et al., "Simplifying Flexible Isosurfaces Using Local Geometric Measures", Visualization, 2004. IEEE Austin, TX, USA Oct. 10-15, 2004, Piscataway, NJ, USA, IEEE, Oct. 10, 2004, pp. 497-504, XP010903138 (eight (8) pages).

Hazel et al., "Object-Level Change Detection in Spectral Imagery", IEEE Transactions on Geoscience and Remote Sensing, IEEE Service Center, Piscataway, NJ, US, vol. 39, No. 3, Mar. 1, 2001, pp. 553-561, XP011021706, (nine (9) pages).

Jiang et al., "A Shape-Based Approach to Change Detection of Lakes Using Time Series Remote Sensing Images", IEEE Transactions on Geoscience and Remote Sensing, IEEE Service Center, Piscataway, NJ, US LNKD-DOI:10.1109/TGRS.2003.817267, vol. 41, No. 11, Nov. 1, 2003, pp. 2466-2477, XP011103588, (twelve (12) pages).

Costa et al., "Chapter 6—Shape Characterization", Jan. 1, 2010, Shape Analysis and Classification: Theory and Practice, Boca Raton, FL: CRC Press, US, pp. 1-46, XP002437963, (forty-six (46) pages).

Lohani, Bharat, "Building extraction", International School in LiDAR technology, IIT Kanpur, Mar. 31- Apr. 4 2008, (five (5) pages).

* cited by examiner

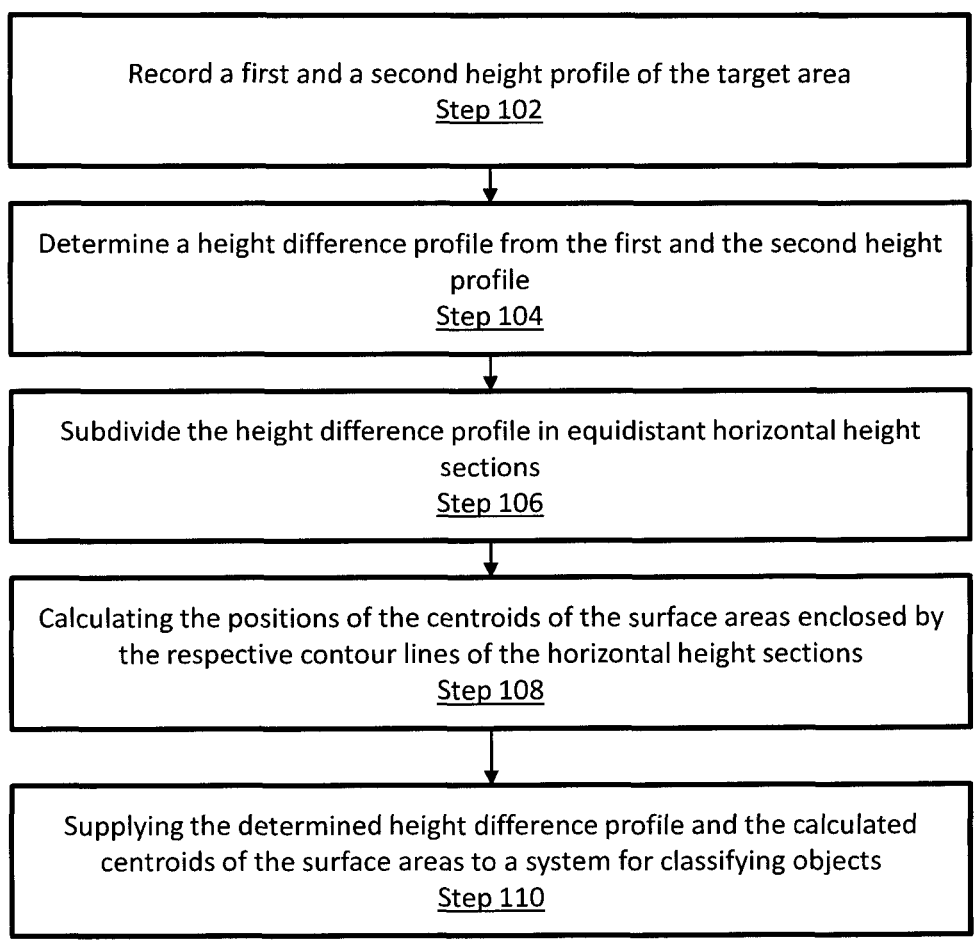

METHOD FOR THE IDENTIFICATION OF OBJECTS

BACKGROUND AND SUMMARY OF THE INVENTION

Exemplary embodiments of the present invention relate to a method for the identification of objects in a predetermined target area.

Remote sensing change detection is a remote sensing method for detecting and mapping changes of the condition of the earth's surface between two or more successive remote sensing images. Detecting and mapping can be carried out visually (visual image interpretation) as well as with the aid of methods of digital image processing. Here, an object is identified as object when it appears for the first time or is suddenly not present anymore. In this manner, object identification can be reduced to real existing changes.

A change detection method typically searches for certain colors in the successive images which, however, cannot be found under certain circumstances because light and shade conditions have changed in the meantime.

Exemplary embodiments of the present invention provide an improved method that is able to identify real existing changes.

BRIEF DESCRIPTION OF THE DRAWING FIGURE

FIG. 1 is a flow diagram of an exemplary method in accordance with the present invention.

DETAILED DESCRIPTION

In order to identify objects in a predeterminable target area, the following method steps are carried out according to the invention:
  recording a first and a second height profile of the target area, wherein the two height profiles are recorded at a predeterminable time interval (step 102),
  determining a height difference profile from the first and the second height profile (step 104),
  subdividing the height difference profile in equidistant horizontal height sections (step 106),
  calculating the positions of the centroids of the surface areas enclosed by the respective contour lines of the horizontal height sections (step 108),
  supplying the determined height difference profile and the calculated centroids of the surface areas to a system for classifying objects (step 110).

Like the conventional change detection method, the method according to the invention is based on a comparison of two images of a target area recorded at different times. By comparing the images it is possible, e.g., to detect changes in the height profile through a pure height measurement (distance measurement) with subsequent height sorting and to allocate the changes to an object. The allocation is carried out by using a database of comparison objects. With a sufficient resolution, wherein the ground and height resolution is in each case less than 10 cm, the shape of the found objects can be three-dimensionally classified and thus, automatic object identification by means of a database-supported comparison system can be ensured.

The method according to the invention can be used in different spectral ranges. Thus, height profiles can be recorded by means of LIDAR, RADAR or SODAR. The height profiles can be recorded, e.g., with a suitable line scanner which operates in the respective spectral range.

According to the invention, the determined height difference profiles are divided into equidistant height sections. Advantageously, areas lying within a predeterminable height interval can be allocated to a uniform color. This results in advantages for a viewer to easily see the visual illustration of the height difference profiles on a monitor. The viewer is immediately able to optically detect differences if, for example, in individual cases, better information is expected by a more detailed analysis of the scenario.

By dividing the height difference profiles into height sections, surface areas enclosed by contour lines are created. From these surface areas, the centroid is calculated by means of integration. The centroid is calculated according to $$\xi = \frac{1}{S} \int \int_S x \, dx \, dy, \quad \eta = \frac{1}{S} \int \int_S y \, dx \, dy$$

wherein $$S = \frac{1}{S} \int \int_S dx \, dy$$

is the enclosed surface area.

The centroid of a single contiguous area of a certain height defines here the section through an object.

If the centroids of the surface areas of two height profiles determined at different times coincide, this corresponds to no objects being added or removed. If the centroid of the height profile has moved, it can be concluded that this involves a new object or a removed old object.

In a particular embodiment of the invention, differential height surface areas are calculated from adjacent contour lines and are additionally supplied to the system for classifying objects. This allows detection of symmetrical volume changes between two chronologically successive height profiles. When symmetrical volume changes occur changes cannot be identified only by determining the centroid of the surface area. Thus, by additionally determining the differential height surface area, it is also possible to provide evidence of symmetrical changes. The differential height surface area can represent a real surface area as well as an imaginary surface area depending on whether the volume change involves a mountain or a valley. In any case, also in case of symmetrical conditions when removing or adding objects, the result is a net differential surface area which is different from zero.

For standardization of the height difference profile, the individual contour lines are advantageously correlated with each other.

Moreover, with the method according to the invention it is possible to consolidate height profiles which were recorded in the visible and/or infrared and/or radar wave range. Thereby, more information from the target area can be detected and evaluated.

What is claimed is:

1. A method for the identification of objects in a predetermined target area, comprising:
  recording a first and a second height profile of the predetermined target area, wherein the first and second height profiles are recorded at a predeterminable time interval;
  determining a height difference profile from the first and the second height profile;

subdividing the height difference profile in equidistant horizontal height sections;

calculating positions of centroids of surface areas enclosed by respective contour lines of the equidistant horizontal height sections; and supplying the determined height difference profile and the calculated centroids of the surface areas to a system for classifying objects.

2. The method according to claim 1, wherein areas lying within a predeterminable height interval are allocated to a uniform color.

3. The method according to claim 1, wherein a differential height surface area is calculated from adjacent contour lines and is also supplied to the system for classifying objects.

4. The method according to claim 1, wherein a comparison of the determined height difference profile and the calculated centroids of the surface areas with corresponding data of an object database is performed to classify objects.

5. A method for the identification of objects in a predetermined target area, comprising:

recording a first and a second height profile of the predetermined target area, wherein the first and second height profiles are recorded at a predeterminable time interval;

determining a height difference profile from the first and the second height profile;

subdividing the height difference profile in equidistant horizontal height sections;

calculating positions of centroids of surface areas enclosed by respective contour lines of the equidistant horizontal height sections; and supplying the determined height difference profile and the calculated centroids of the surface areas to a system for classifying objects, wherein the contour lines are correlated with each other in order to standardize the height difference profile.

* * * * *